United States Patent [19]
Ohki

[11] Patent Number: 5,243,178
[45] Date of Patent: Sep. 7, 1993

[54] FOCUS DETECTING OPTICAL DEVICE UTILIZING TWO PLANE PARALLEL PLATES

[75] Inventor: Hiroshi Ohki, Yokohama, Japan

[73] Assignee: Nikon Corporation, Tokyo, Japan

[21] Appl. No.: 933,088

[22] Filed: Aug. 21, 1992

[30] Foreign Application Priority Data

Aug. 27, 1991 [JP] Japan ............................. 3-238857

[51] Int. Cl.$^5$ .............................................. G01J 1/20
[52] U.S. Cl. ............................ 250/201.5; 359/639; 369/44.23
[58] Field of Search ................ 250/201.5; 359/640, 359/639; 369/44.23

[56] References Cited

U.S. PATENT DOCUMENTS 4,358,200 11/1982 Heemskerk et al. ................ 359/640
4,712,205 12/1987 Smid et al. ............................ 369/45
4,723,845 2/1988 Mizutani et al. ..................... 250/561

Primary Examiner—David C. Nelms
Assistant Examiner—T. Davenport
Attorney, Agent, or Firm—Shapiro and Shapiro

[57] ABSTRACT

In a focus detecting optical system wherein a beam transmitted through an objective optical system is divided to thereby effect focus detection, a beam reflected by an optical disk is transmitted through an objective lens and a half mirror and is condensed by a condensing lens. The light beam from this condensing lens is divided by a dividing member comprising a pair of obliquely disposed plane parallel plates and becomes divided beams parallel to each other, and these divided beams arrive at a four-division detector. The dividing lines of this detector are on the meridional plane of the objective optical system.

2 Claims, 4 Drawing Sheets

FOCUS DETECTING OPTICAL DEVICE UTILIZING TWO PLANE PARALLEL PLATES

BACKGROUND OF THE INVENTION

1. Field of the Invention

This invention relates to a focus detecting optical device in an optical information recording-reproducing apparatus.

2. Related Background Art

As methods of detecting the focus error of an optical information recording-reproducing apparatus, there are known the knife edge method, the astigmatism method and the critical angle method, and above all, use has been widely made of the knife edge method which is simple in construction and which is not liable to be subjected to disturbance such as diffraction by a guide groove in an optical disk. The principle of this method is shown in FIG. 3 of the accompanying drawings.

In FIG. 3A, a photoelectric detector divided into two (comprising two light receiving elements A and B) is disposed on the focal plane of an objective optical system (of which only the condensing lens 106 is shown) and is positioned so that the dividing line of the detector 108 may coincide with the meridional plane of the objective optical system. A knife edge 107 is disposed between the objective optical system and the detector 108 for movement in a direction perpendicular to the optical axis of the objective optical system. Although not shown, an optical disk is of course disposed at the left of the objective optical system so that a light beam reflected by the recording area forming surface of the optical disk may enter the objective optical system.

Here, consider a case where in the focus detecting optical system of the construction as shown in FIG. 3A, half of the light beam passed through the objective optical system is intercepted by the knife edge 107. First, when the optical disk is in the in-focus position, the imaging point of the reflected light from the optical disk coincides with the dividing line of the detector 108 and the difference (A−B) between the output signals of the light receiving elements A and B becomes 0.

In contrast, when the optical disk is off the in-focus position and is close to the objective optical system, the reflected light therefrom is imaged rearwardly of the detector 108 and the semicircular spot of the light beam shifts toward the light receiving element A side. Therefore, the difference (A−B) between the output signals of the light receiving elements A and B increases in the plus direction. Also, when the optical disk is far from the objective optical system, the reflected light is once imaged short of the detector 108 and then expands and therefore, the semicircular spot shifts toward the light receiving element B side and the difference (A−B) between the output signals of the light receiving elements A and B increases in the minus direction.

This state is shown in the graph of FIG. 3B (wherein the ordinate represents the difference (A−B) between the output signals of the light receiving elements A and B, and the abscissa represents the displacement amount of the optical disk from the in-focus position), and the difference (A−B) between the output signals of the two light receiving elements A and B provides a focus error signal.

In the construction of FIG. 3A, however, half of the light beam is intercepted and this is disadvantageous in respect of sensitivity and therefore, actually, as disclosed, for example, in U.S. Pat. No. 4,712,205, use is made of a focus detecting optical system of such a construction as shown in FIG. 4A of the accompanying drawings.

In the focus detecting optical system of FIG. 4A, instead of half of a light beam being intercepted, a light beam passed through an objective optical system (of which only the condensing lens 206 is shown) is divided into two by a dividing member 207, and the thus divided beams b1 and b2 are received by a detector 208. The detector 208 in FIG. 4A has its light receiving surface divided into four (comprises light receiving elements A, B, C and D), and is disposed on the focal plane of the objective optical system so that the dividing line thereof may coincide with the meridional plane of the objective optical system.

As the dividing member 207, there is known one comprising two wedge-shaped prisms 207a and 207b cemented together as shown in FIG. 4A. The two wedge-shaped prisms 207a and 207b are arranged in a direction orthogonal to the meridional plane of the objective optical system with the meridional plane as the joint surface, and the sides thereof are joined together so that the directions of inclination of the inclined surfaces thereof facing the detector 208 may be opposite to each other.

When in the detecting optical system of the construction as shown in FIG. 4A, an optical disk (not shown) disposed at the left in the plane of the drawing sheet of FIG. 4 is in the in-focus position, the imaging points of the divided two beams b1 and b2 both coincide with the dividing line of the detector 208.

In contrast, when the optical disk deviates from the in-focus position and becomes close to the objective optical system side, the reflected light from the optical disk is imaged rearwardly of the detector 208. Therefore, the semicircular spot of the divided beam b1 shifts toward the light receiving element A side and the semicircular spot of the divided beam b2 shifts toward the light receiving element C side. Also, when the optical disk is far from the objective lens, the reflected light therefrom is once imaged short of the light receiving surface of the detector and then expands and therefore, the semicircular spot of the divided beam b1 shifts toward the light receiving element B side and the semicircular spot of the divided beam b2 shifts toward the light receiving element D side.

Thus, if (A+C)−(B+D) is found from the outputs of the light receiving elements, this value becomes 0 when the optical disk is in the in-focus position, and increases toward the plus side when the optical disk becomes close to the objective optical system side, and increases toward the minus side when the optical disk becomes far from the objective optical system. This state is shown in the graph of FIG. 4B (wherein the ordinate represents the output signal (A+C)−(B+D) and the abscissa represents the displacement amount of the optical disk from the in-focus position), and (A+C)−(B+D) provides a focus error signal.

The adoption of the construction of FIG. 4A leads to the advantage that sensitivity doubles as compared with the case of FIG. 3A and detection is not liable to be affected by the lateral deviation (the deviation in the focal plane) of the detector 208. That is, in the construction of FIG. 3A, when the detector 108 deviates in the direction of division, it directly becomes a factor of a detection error, while in the construction of FIG. 4A, even if the detector 208 deviates in the directions of division of the light receiving elements A and B and the light receiving elements D and C, the error amount (A+B) and the error amount (B+D) of the focus error signal are offset by each other. For example, when the detector deviates toward the light receiving elements B, C side, the semicircular beam correspondingly shifts toward the light receiving elements A, D side and the outputs of the light receiving elements A and D become great, but this affects is no way as the value of (A+C)−(B+D). Accordingly, any detection error is not liable to occur. Also, the four-division detector used in FIG. 4A is readily commercially available and is suitable for practical use.

However, the prior-art focus detecting optical system as described above has suffered from the following problems. Description will hereinafter be made with reference to FIG. 2B of the accompanying drawings showing the manner in which a light beam is divided by a prior-art dividing member.

In FIG. 2B, the entrance surfaces of wedge-shaped prisms 207a and 207b are perpendicular to the optical axis and the exit surfaces thereof are inclined in opposite directions with respect to the optical axis and therefore, a light beam rectilinearly travels in the prisms 207a and 207b, and a beam transmitted through the prism 207a and a beam transmitted through the prism 207b are bent in opposite directions in the exit surfaces and separated from each other. That is, the divided beams b1 and b2 travel obliquely with respect to the optical axis of the objective optical system, and the divided beams form therebetween a certain angle α conforming to the wedge angle of the prisms 207a and 207b. Thus, the separation spacing S' between the two light spots on the light receiving surface of the detector is proportional to the spacing d between the dividing member 207 and the detector. Accordingly, the dividing member 207 must be placed at such a location that the separation spacing S' is of a value corresponding to the size of the detector, and the location thereof cannot be determined arbitrarily.

Generally, it is often the case that the focal length of the condensing lens of an objective optical system is designed to a great length in order to earn detection sensitivity (to make [the beam shift amount]/[the displacement amount of the optical disk from the in-focus position]) great, and the outer dimension of a four-division detector is often as small as the order of several hundred microns. Thus, the angle α formed between the divided beams is set to a very small value and the wedge angle of the prisms constituting the dividing member becomes extremely small, and the working tolerance becomes very severe.

If the wedge angle of the prisms is made great (the angle α formed between the divided beams also becomes great) and the spacing d between the detector and the dividing member is made small, the working tolerance of the prisms will become loose, but the tolerance of the spacing d will now become severe. Also, the divided beams will obliquely enter the detector and detection accuracy will be reduced. Further, in such case, the diameter of the beam transmitted through the dividing member will become very small (because the dividing member is disposed near the focal plane of the objective optical system) and thus, the roughness or the like of the level difference portion (the joint portion of the prisms) will adversely affect detection accuracy.

SUMMARY OF THE INVENTION

This invention has been made in view of such points and has as its object the provision of a focus detecting optical system in which when dividing a light beam transmitted through an objective optical system and effecting focus detection, the making of a dividing member is easy and the degree of freedom of the designing of the optical system is high and which is advantageous in respect of focus detection.

According to the present invention, in a focus detecting optical system provided with an objective optical system for condensing a light beam from a light source and applying it to the recording area forming surface of an optical recording medium, a dividing member for dividing said light beam passed through said objective optical system into two, and detecting means for receiving the light beams divided by said dividing member and detecting the focus of said objective optical system, said dividing member is comprised of a pair of obliquely disposed plane parallel plates to thereby achieve the above object.

The action of the present invention will hereinafter be described with reference to FIG. 2A of the accompanying drawings. FIG. 2A shows the manner in which a light beam is divided by the dividing member in the present invention, in contrast with FIG. 2B (an example of the prior art).

In FIG. 2A, a pair of plane parallel plates 7a and 7b equal in thickness to each other are juxtaposed in a direction perpendicular to the meridional plane of an objective optical system (a direction perpendicular to the plane of the drawing sheet) with the meridional plane as the center, and are inclined with respect to each other at an angle θ. Where such a dividing member 7 is used, a beam incident on the plane parallel plate 7a and a beam incident on the plane parallel plate 7b are bent in opposite directions by the entrance surface and separated from each other, and are again bent by the exit surface and emerge in directions parallel to the optical axis. That is, the divided beams B1 and B2 emerging from the dividing member 7 are parallel to each other and the spacing S therebetween is given by the following expression (1):

$$S \approx t \cdot \sin\theta \{1 - \cos\theta/(n^2 - \sin^2\theta)^{\frac{1}{2}}\}, \quad (1)$$

where t is the thickness of the plane parallel plates 7a and 7b, and n is the refractive index thereof.

As shown in expression (1), the spacing S between the divided beams in FIG. 2A is determined to a constant value by the angle formed between the two plane parallel plates 7a and 7b and the thickness t and refractive index n of the plane parallel plates 7a and 7b, and is not varied by the spacing between the dividing member and the detector as in the case of FIG. 2B. Accordingly, in the present invention, the dividing member can be disposed at any location between the objective optical system and the detector. This means the advantage that the positional tolerance of the dividing member in the direction of the optical axis is very great and the location for insertion of the dividing member can be determined with the balance between the dividing member and the beam diameter (as previously described, the detection error will increase if the beam diameter is too small relative to the dividing member) taken into consideration.

Also, in the present invention, the divided beams are incident on the detector perpendicularly thereto and this is advantageous in terms of detection accuracy. Further, the values of t and θ of the dividing member used in the present invention can be set to suitable values as an optical part, and the manufactury tolerance also is great. For example, when θ is found from expression (1) with respect to a case where S=200 μm, t=5 mm and n=1.8, θ is about 5°. It can be readily calculated from expression (1) that the variation in the separation spacing S is small relative to the errors of t, n and θ.

Of course, the plane parallel plates constituting the dividing member in the present invention should preferably be good in the degree of parallelism, but if the two plane parallel plates have the same wedge angle, that wedge angle itself need not be suppressed to a very small angle. It is because if the wedge angles of the two prisms are the same and the prisms are obliquely disposed so that the direction of deflection of the light by the wedge angle may be on the same side with respect to the optical axis, the divided beams will become inclined at the same angle in the same direction with respect to the optical axis of the objective optical system and the parallelism between the divided beams will be kept. If in making the dividing member of the present invention, a pair of plane parallel plates are polished as a unit (as a plane parallel plate) and thereafter severed and used, the above-described condition will be readily satisfied and therefore, after all, it can be said that the tolerance of the degree of parallelism of the plane parallel plates is great.

DESCRIPTION OF THE PREFERRED EMBODIMENT

Figure 1:
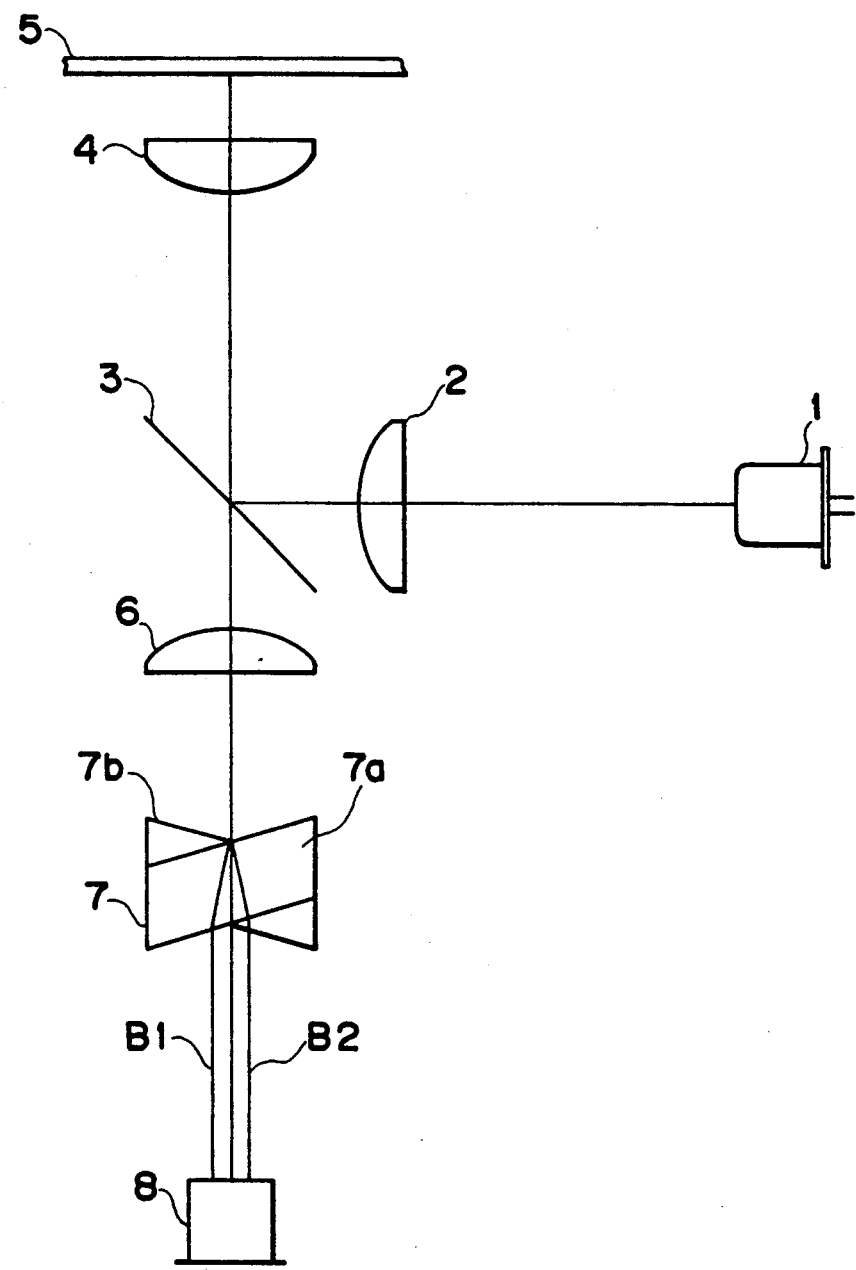
FIG. 1 is an optical path diagram showing the construction of a focus detecting optical system according to an embodiment of the present invention.
Figure 2A:
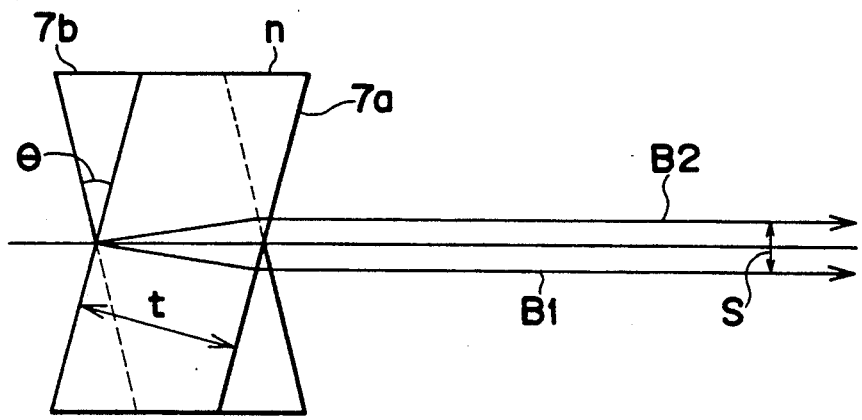
FIG. 2A is an optical path diagram showing the manner in which a light beam is divided in the present invention.
Figure 2B:
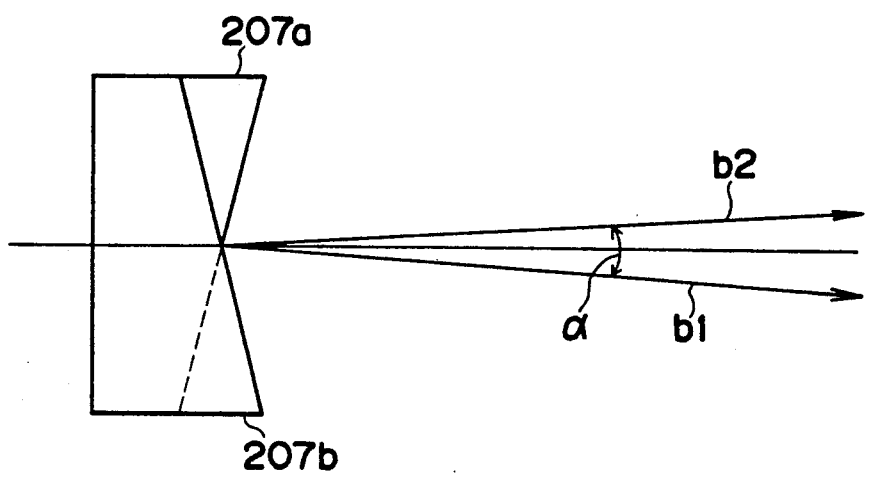
FIG. 2B is an optical path diagram showing the manner in which a light beam is divided in the prior art.
Figure 3A:
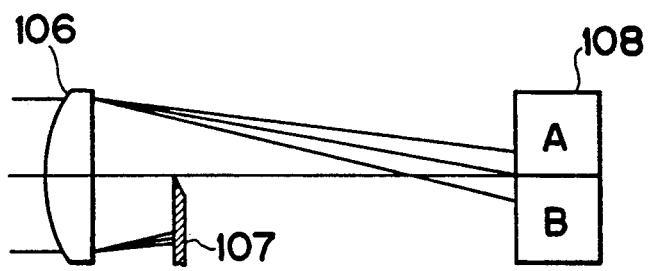
FIG. 3A is an optical path diagram showing the construction of a focus detecting optical system according to the prior art.
Figure 3B:
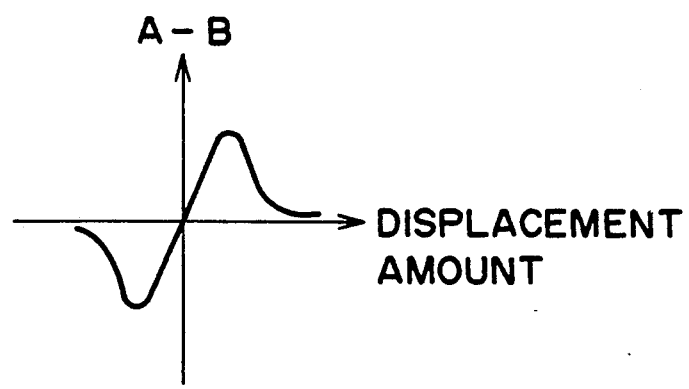
FIG. 3B is a graph for illustrating a focus error signal in the optical system of FIG. 3A.

FIG. 1 is an optical path diagram showing the construction of a focus detecting system according to an embodiment of the present invention.

In FIG. 1, a light beam emitted from a coherent light source 1 is collimated by a collimator lens 2 and is reflected by a half mirror 3. The light beam is then transmitted through an objective lens 4 and forms a light spot of a diffraction limit on the recording area forming surface of an optical disk 5.

The light beam reflected by the optical disk 5 is again transmitted through the objective lens 4 and passes to the half mirror 3, through which the light beam is transmitted and is condensed by a condensing lens 6. In the present embodiment, the objective lens 4 and the condensing lens 6 together constitute an objective optical system which is a parallel system.

The condensed light beam from the condensing lens 6 has one half thereof separated to the right side as viewed in the figure and the other half thereof separated to the left side as viewed in the figure, by a dividing member comprising a pair of plane parallel plates 7a and 7b. In FIG. 1, the plane parallel plates 7a and 7b are juxtaposed in a direction perpendicular to the meridional plane of the objective optical system (a direction perpendicular to the plane of the drawing sheet) with the meridional plane (a plane in the plane of the drawing sheet) as their joint surface, and are inclined at an angle θ with respect to each other. This dividing member 7 may be made by cementing two plane parallel plates together, or in some cases, may be made by integral molding.

The divided beams B1 and B2 emerging from the dividing member 7 travel in parallelism to each other as shown and arrive at a detector 8. The detector 8 is disposed in the focal plane of the condensing lens 6 and has a light receiving surface divided into four. The position of the detector 8 in the focal plane is regulated so that the dividing lines of the light receiving surface may coincide with the meridional plane of the objective optical system.

The position of the dividing member 7 in the direction of the optical axis, as already described, can be set at any location between the condensing lens 6 and the detector 8. However, as the dividing member 7 becomes closer to the detector 8, the beam diameter becomes smaller and therefore, it is desirable that said position be set with the balance between the size of the dividing member 7 and the beam diameter taken into account.

Also, it is preferable that the separation spacing between the divided beams B1 and B2 be substantially equal to the central spacing between the two light receiving surfaces of the four-division detector 8 arranged in a direction in the plane of the drawing sheet. That is, the angle θ formed between the plane parallel plates 7a and 7b, the thickness t and refractive index n of the plane parallel plates can be set so that the aforementioned expression (1) may hold true of the central spacing (=the separation spacing between the beams) S between the light receiving surfaces.

Figure 4A:
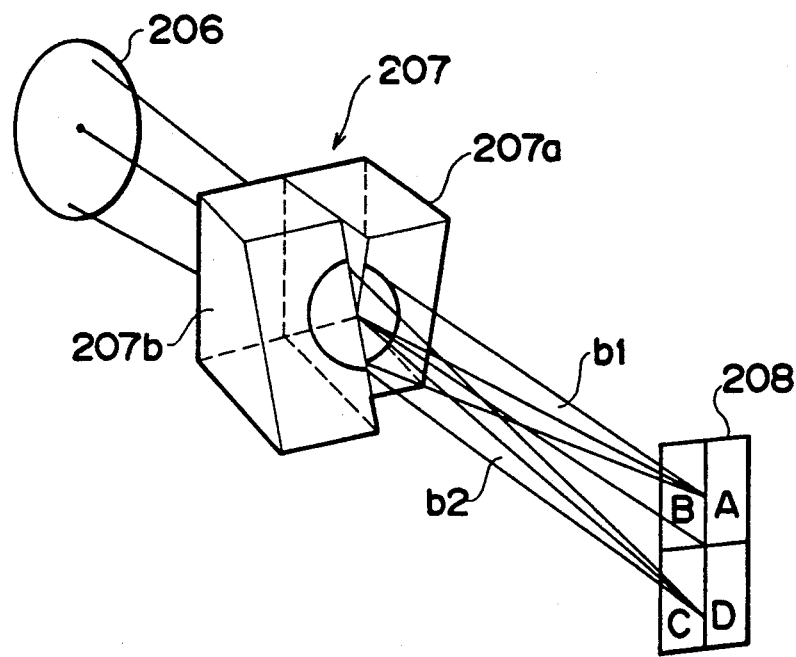
FIG. 4A is an optical path diagram showing the construction of another focus detecting optical system according to the prior art.

The principle itself of focus detection in the focus detecting optical system of the construction as described above is basically the same as the case of the aforedescribed FIG. 4A, but will hereinafter be briefly described with reference to FIG. 1. For the sake of description, the four light receiving elements constituting the four-division detector 8 are defined as A, B, C and D, and it is to be understood that B and C are disposed from the left of this side of the plane of the drawing sheet and A and D are disposed from the left of the inner side of the plane of the drawing sheet.

First, when the optical disk 5 is in the in-focus position, the imaging point of the reflected light from the optical disk 5 coincides with the dividing line which divides the light receiving surface of the detector 8 in a direction perpendicular to the plane of the drawing sheet.

In contrast, when the optical disk 5 deviates from the in-focus position and becomes close to the objective optical system, the reflected light is imaged rearwardly of the light receiving surface and therefore, the semicircular spot of the divided beam B1 shifts toward this side of the plane of the drawing sheet (the B side) and the semicircular spot of the divided beam B2 shifts toward the inner side of the plane of the drawing sheet (the D side). Also, when the optical disk becomes far from the objective optical system, the reflected light from the optical disk 5 is imaged short of the detector 8 and then expands and therefore, the semicircular spot of the divided beam B1 shifts toward the inner side of the plane of the drawing sheet (the A side) and the semicircular spot of the divided beam B2 shifts toward this side of the plane of the drawing sheet (the C side).

Figure 4B:
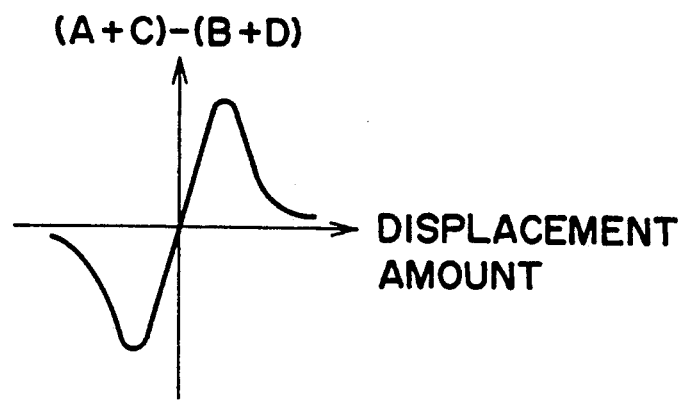
FIG. 4B is a graph for illustrating a focus error signal in the optical system of FIG. 4A.

Accordingly, if $(A+C)-(B+D)$ is found from the output signals of the light receiving elements, as in FIG. 4B, this value becomes 0 when the optical disk 5 is in the in-focus position, and increases when the optical disk 5 becomes far from the in-focus position. That is, the focus detection of the objective optical system is done with $(A+C)-(B+D)$ as a focus error signal.

As described above, in the focus detecting optical system according to the present invention, the dividing member comprising a pair of obliquely disposed plane parallel plates is used as the means for dividing the light beam reflected by the optical disk and passed through the objective optical system, whereby the divided beams are made parallel to each other and therefore, the dividing member can be disposed at any location between the objective optical system and the detector. This leads to the advantage that the location of the dividing member can be determined with the beam diameter taken into account and the positioning tolerance is very great.

Also, the angle of inclination $\theta$, the thickness t and the refractive index n of the pair of plane parallel plates constituting the dividing member used in the present invention can be set to suitable values as an optical part and the tolerance thereof is sufficiently great and therefore, the dividing member of the present invention is markedly easy to manufacture as compared with the prior-art dividing member using wedge-shaped prisms.

What is claimed is:

1. A focus detecting optical device including an objective optical system for condensing a light beam from a light source and applying it to the recording area forming surface of an optical recording medium, a dividing member for dividing said light beam reflected by said recording area forming surface and passed through said objective optical system into two beams, said dividing member comprising a pair of obliquely disposed plane parallel plates, and detecting means for receiving the light beams divided by said dividing member and detecting the focus of said objective optical system.

2. A focus detecting optical device according to claim 1, wherein for a desired separation spacing S between said light beams, the thickness t and refractive index n of said plane parallel plates and the angle $\theta$ formed between said plane parallel plates satisfy the following condition:

$$S \approx t \cdot \sin\theta \{1 - \cos\theta/(n^2 - \sin^2\theta)^{\frac{1}{2}}\}.$$

* * * * *